United States Patent [19]
Serkiz

[11] Patent Number: 5,998,490
[45] Date of Patent: Dec. 7, 1999

[54] NONAQUEOUS OZONATION OF VULCANIZED RUBBER

[75] Inventor: Steven M. Serkiz, Aiken, S.C.

[73] Assignee: Westinghouse Savannah River Company, Aiken, S.C.

[21] Appl. No.: 08/853,130

[22] Filed: May 8, 1997

[51] Int. Cl.⁶ .................................................. C08J 11/04
[52] U.S. Cl. ........................... 521/41; 521/44.5; 528/489; 585/832
[58] Field of Search .................... 521/41, 44.5; 528/489; 585/832

[56] References Cited

U.S. PATENT DOCUMENTS

| | | | |
|---|---|---|---|
| 4,076,617 | 2/1978 | Bybel et al. | 422/127 |
| 4,161,464 | 7/1979 | Nicholas | 521/41.5 |
| 4,305,850 | 12/1981 | Watabe et al. | 521/42.5 |
| 4,426,459 | 1/1984 | Watabe et al. | 521/42.5 |
| 5,264,640 | 11/1993 | Platz | 585/241 |
| 5,275,948 | 1/1994 | Straube et al. | 264/349 |
| 5,304,576 | 4/1994 | Martinez | 521/41 |
| 5,356,939 | 10/1994 | Burrowes et al. | 521/41.5 |
| 5,369,215 | 11/1994 | Platz | 585/241 |
| 5,602,186 | 2/1997 | Myers et al. | 521/41 |

*Primary Examiner*—James J. Seidleck
*Assistant Examiner*—Olga Asinovsky
*Attorney, Agent, or Firm*—Dority & Manning

[57] ABSTRACT

A process and resulting product is provided in which a solid particulate, such as vulcanized crumb rubber, has the surface functional groups oxidized by ozonation using a nonpolar solvent. The ozonation process renders the treated crumb rubber more suitable for use in new rubber formulations. As a result, larger loading levels of the treated crumb rubber can be used in new rubber mixtures.

22 Claims, 8 Drawing Sheets

FIG. 1

| Sample | | Poly-Sulfide | Arom. Sulfur | Sulfox-ide | Sulfone | Sulfate | Other |
|---|---|---|---|---|---|---|---|
| Tire Rubber | P (eV) | 0.1 | 1.3 | 3.1 | 7.6 | 9.8 | 5.7 |
| | A (%) | 25.8 | 32.8 | 27.3 | 4.3 | 8.4 | 1.4 |
| #5 Blank FC40 + H$_2$O | P (eV) | 0.0 | 1.2 | 3.0 | 7.6 | 9.6 | 5.7 |
| | A (%) | 27.1 | 32.8 | 26.3 | 3.6 | 8.2 | 2.0 |
| #6 5 hr Rxn, O$_3$, FC40+ H$_2$O | P (eV) | -0.2 | 1.1 | 3.0 | 7.8 | 9.7 | 6.2 |
| | A (%) | 14.9 | 24.4 | 35.0 | 6.0 | 17.2 | 2.5 |

FIG. 2

| Sample | Poly-Sulfide | Arom. Sulfur | Sulfox-ide | Sulfone | Sulfate |
|---|---|---|---|---|---|
| Tire Rubber | 41.9 | 48.0 | 7.5 | -- | 2.6 |
| #5 Blank, FC40 + H$_2$O | 43.5 | 47.4 | 6.8 | -- | 2.4 |
| #6 5 hr Rxn, O$_3$, FC40 + H$_2$O | 28.4 | 41.9 | 18.1 | 1.0 | 10.7 |

NONAQUEOUS OZONATION OF VULCANIZED RUBBER

The United States Government has rights to this invention pursuant to contract number DE-AC09-89SR18035 between the U.S. Department of Energy and Westinghouse Savannah River Company.

BACKGROUND OF THE INVENTION

1. Field of the Invention

The present invention relates broadly to the surface treatment of solids and more particularly to the recycle of rubber products and still more particularly to the use of recycled crumb rubber.

2. Discussion of Background

Existing efforts to recycle used rubber, in particular used tires, into new rubber articles, especially tires, have met with only limited commercial success. In the United States alone, there are currently billions of tires stock-piled in long term storage with additional millions being added annually to such stock piles. Because of the large volume involved with tires, this discussion will be directed to tires although much of these comments are applicable to other new and used rubber products. Those skilled in the art will know when the comments are appropriate to other new or used rubber products. Also, because used rubber is usually processed in the form of crumb rubber, references herein will be to rubber in that form. A major limitation in the recycling of used tire material is that the used tire rubber can not be readily mixed in economical proportions to form suitable new tire polymer mixes.

During the vulcanization process of new tires, accelerators, promoters, and/or initiators, are used which result in the formation of large numbers of sulfur crosslinks in the resulting vulcanized tire rubber. It is generally believed in the art that the sulfur compounds which are present in used tire rubber are highly reactive in the tire curing process such that when used tire material is mixed with new tire polymer, the used material is too reactive. Reformulation of used tire rubber with virgin materials results in a brittle compound unsuitable for many uses and among them are vehicle tires such as automobile or truck tires. Heretofore, efforts to reclaim scrap rubber have included a physical sheering process which is suitable for a rubber which can be mixed with asphalt, forming asphalt rubber. Such use is taught in U.S. Pat. No. 5,304,576.

It is also known to take used rubber and depolymerize the vulcanized rubber in an organic solvent and then recover various polymerized fractions as taught in U.S. Pat. No. 5,438,078. Similarly, U.S. Pat. No. 5,264,640 teaches taking scrap rubber from used tires and regenerating the monomeric chemicals which are subsequently recovered. This method uses gaseous ozone to break down the crosslinked structure of the rubber followed by thermal depolymerization in a reaction chamber. U.S. Pat. No. 5,369,215 teaches a similar process in which used tire material may be depolymerized under elevated temperatures and at a reduced pressure to recover the monomeric compounds.

U.S. Pat. No. 4,161,464 teaches a method to devulcanize rubber from commercial scrap rubber in which the vulcanized particles of used tires are reacted with an organic solvent to swell the rubber particles. Following swelling, the vulcanized particles are reacted with an aqueous solution of $OH^-$ ions. The ions disrupt polysulfide crosslinks which produces a rubber product better able to be recycled.

U.S. Pat. No. 5,602,186 to Myers et al., recites a process for devulcanizing a rubber crumb by introducing an alkali metal in the presence of a solvent to break polysulfide crosslinkages. The resulting devulcanization process is used to liberate rubber polymer There remains a strong need for a practical, economical system for processing used rubber into a material which can be incorporated at a substantial loading level into new rubber compounding mixtures. There also remains a dire if not critical need for a practical, economical system for processing used tires into a material which can be incorporated at a substantial loading level into new tire compounding mixtures. Preferably, such a system could be operated under ambient conditions without the use of hazardous reactants or solvents.

SUMMARY OF THE INVENTION

The present invention is a process and the resulting product of the process in which used rubber having relatively high surface reactivity, including levels of reactive agents such as sulfur crosslinks present on the surface of the rubber, have the reactive agents (including at least sulfur crosslinks) removed, changed, and/or decreased in number such that the resulting treated rubber may be incorporated into polymer mixes for new rubber products, including tires, at much greater levels than used heretofore.

In accordance with this invention, it has been demonstrated that particles of used crumb rubber can be surface treated with ozone dissolved in a nonaqueous solvent which effectively alters the surface chemistry and reactivity of the so treated vulcanized crumb tire rubber. The devulcanization process is an oxidation reaction carried out by the ozone. It has been found that the surface treatment of the crumb rubber particle reduces the surface reactivity of the crumb rubber particles to an extent that the rubber particles can be integrated into a new tire polymer mix at much higher levels than previously possible. The ozone induced oxidation of the crumb rubber can be limited to essentially a surface treatment of the crumb rubber. As used herein, "surface treatment" means primarily the outer surface but does not necessarily limit such to a monomolecular layer or exclude thin molecular or multi-molecular layers immediately below a surface layer. The limitation of treatment to the surface is important in that the desirable physical properties of the crumb rubber particles remains largely intact. Accordingly, the crumb rubber is compatible with the new rubber polymer component of a tire mix.

The use of a nonaqueous solvent as an ozone carrier allows a higher ozone concentration than an aqueous based ozone carrier system. Further, the ozone is, or can be, retained within the nonaqueous solvent for a much greater period of time. As a result, the process can be carried out on an economical basis and with the use of a solvent system which is relatively non toxic and environmentally acceptable, can be readily recycled, and can be safely handled on a commercial scale.

It is thus an object of this invention to provide a nonaqueous ozonation solvent system which reduces by an effective amount the surface reactivity of used crumb rubber such that an increased amount of used crumb rubber can be mixed with a new tire polymer mix.

It is another object of this invention to provide a crumb rubber having an improved surface chemistry suitable for use in compounding a new tire rubber mix.

It is yet another object of this invention to provide a compounded rubber mix containing increased amounts of used crumb rubber.

It is a further object of this invention to provide a process of devulcanizing a rubber particulate in which the devulcanization is substantially limited to the surface of the particulate, leaving the interior chemical and physical properties of the particulate largely unchanged.

It is yet another and more particular object of this invention to provide a process for ozone saturation which is compatible with a hydrophobic material.

It is yet a further and more particular object of this invention to provide a non-polar, organic solvent which enables one to effectively treat a hydrophobic material.

It is still a further and more particular object of this invention to provide a process for devulcanizing used tires which reduces the presence of free radical ozone scavengers which would otherwise lower the efficiency of the ozonation process.

It is still a further and more particular object of this invention to provide a nonaqueous solvent/carrier ozonation process using a nonpolar organic solvent.

These and other objects of this invention are provided by a process for devulcanizing and/or otherwise surface deactivating or modifying scrap rubber comprising: providing a supply of crumb rubber, said crumb rubber having an initial surface oxidation state; contacting the surface of the crumb rubber with a non-polar organic solvent, the solvent carrying an effective amount of ozone; oxidizing compounds on the surface of the crumb rubber to one of a plurality of oxidation products; thereby, providing a crumb rubber having a treated surface defining a treated oxidation state, the treated oxidation state being more oxidized than the initial oxidation state and less reactive during formulation and curing into a new rubber product.

DETAILED DESCRIPTION

A process for treating the crumb rubber is based upon a series of oxidation reactions using ozone in a nonaqueous solvent whereby the highly reactive agents which are, or at least include, sulfur-carbon (S—C) and sulfur-sulfur (S—S) bonds on the crumb rubber surface are chemically cleaved. Surface characteristics or morphology which may result therefrom or from other changes and which may be beneficial are also achieved.

In the initial vulcanization of tire rubber, sulfur and sulfur containing compounds such as accelerators and initiators are added which crosslink with the tire polymer. The bonding and crosslinkage stabilizes the polymer matrix, which imparts important desired properties to the rubber and increases the useful life of the tire. The presence of the sulfur compound within used tire rubber has limited the reuse of used tire rubber in new tire mixes. The sulfur containing compounds present on the rubber reacts, it is believed, too quickly in a new rubber mix and results in a final product which is brittle and unsuitable for many uses and especially for use as a tire.

As used in the present invention, the term "devulcanized" is used to indicate that certain surface properties of the particulate crumb rubber have been chemically modified. It is believed that the surface activity of mono, di, and polysulfides which formed polymer cross linkages during the initial vulcanization process have been reduced by the present ozone oxidation process. As such, the crumb rubber is referred to here as "devulcanized" though it is understood that a substantial number of vulcanization products persist in the treated crumb rubber and in fact remain beneficial in the overall reformulations of new rubber mixes with the treated crumb rubber. Again, it is to be understood that other chemical and/or physical changes may take place which have a beneficial effect on the used rubber in reformulating it into new rubber products.

The work herein uses crumb tread rubber conforming to ASTM standard D5603. The crumb rubber was obtained from a commercial supplier of crumb rubber and is believed to represent a heterogenous mixture of different tire formulations from a variety of manufacturers. It has been found that the crumb rubber can be used over a wide range of particulate sizes, and the process is not size dependent upon the crumb rubber used. For example, standard sizes of 200-80 mesh and even larger have and can be used and the improvements of the present invention have been observed in all sizes of crumb rubber evaluated.

The ASTM standard crumb rubber material was chosen for its known uniformity. It is readily appreciated by those having ordinary skill in the art that crumb rubber originating from used passenger or truck tires will typically encompass products originating from numerous manufacturers and comprising an enormous assortment of chemical constituents. Accordingly, a wide variety of different chemicals are expected to be present on the surface of untreated crumb rubber. This is particularly true for the highly reactive sulfur compounds originally added to the rubber during the vulcanization process. The present invention provides a treatment process which effectively modifies broad classes of reactive chemical constituents found on the surface of crumb rubber. Accordingly, the treatment process will address expected variations encountered in a commercial source of crumb rubber.

As used herein, "solvent" is used and defined to cover a carrier or carrier system as well. However, for convenience, the term solvent is used most frequently. One solvent found useful in this process is the non-polar fluorinated hydrocarbon solvent FC40 (a product of 3M Company). FC40 is non-toxic, has low vapor pressure, is stable under the reaction conditions (i.e. does not react or disintegrate), is easily recycled, allows very high ozone solubility concentrations (i.e. concentrations which approach one order of magnitude greater than aqueous solvents), and has higher stability or retention properties for ozone than aqueous solvents. However, other solvents which are non-reactive with ozone can also be used but not always with the same results.

One having ordinary skill in the art will be able to evaluate and recognize useful solvents and/or carriers by the properties of the solvents. Useful solvents should meet the required criteria of being substantially inert in the oxidizing reaction environment of this process. They preferably also have a low vapor pressure, and a high ozone solubility or carrying capacity, very low solvency for or penetration ability of the rubber. Non-polar solvents coat or wet the hydrophobic surfaces of rubber and are therefore beneficial in this respect. However, polar solvents, combined with a surfactant or its equivalents, would also coat or wet the rubber surface.

Preferably the solvent does not adhere to the rubber through adsorption or other action. However, such solvents are not excluded herein, they can be stripped from the rubber by numerous conventional means if the use of such solvent were otherwise preferred. suitability and efficacy of a desired solvent or solvent mixture in a particular application can readily he determined by routine experimentation or screening using an ozone diffusor to determine the saturation level and half-life of the ozone therein. Also, the solvent and/or penetration of the solvent can be determined using well known techniques.

Examples of other suitable solvents or carriers include FC77, another fluorocarbon available from 3M company, other fluorocarbons, and carbon tetrachloride. FC77 does not offer as high an ozone concentration as FC40. Carbon tetrachloride, while compatible with ozone as a solvent/carrier, is less preferred based on environmental and toxicity concerns. Similarly, mixtures in varying proportions of different ozone solvents are contemplated in some cases and to advantage.

Figure 1:
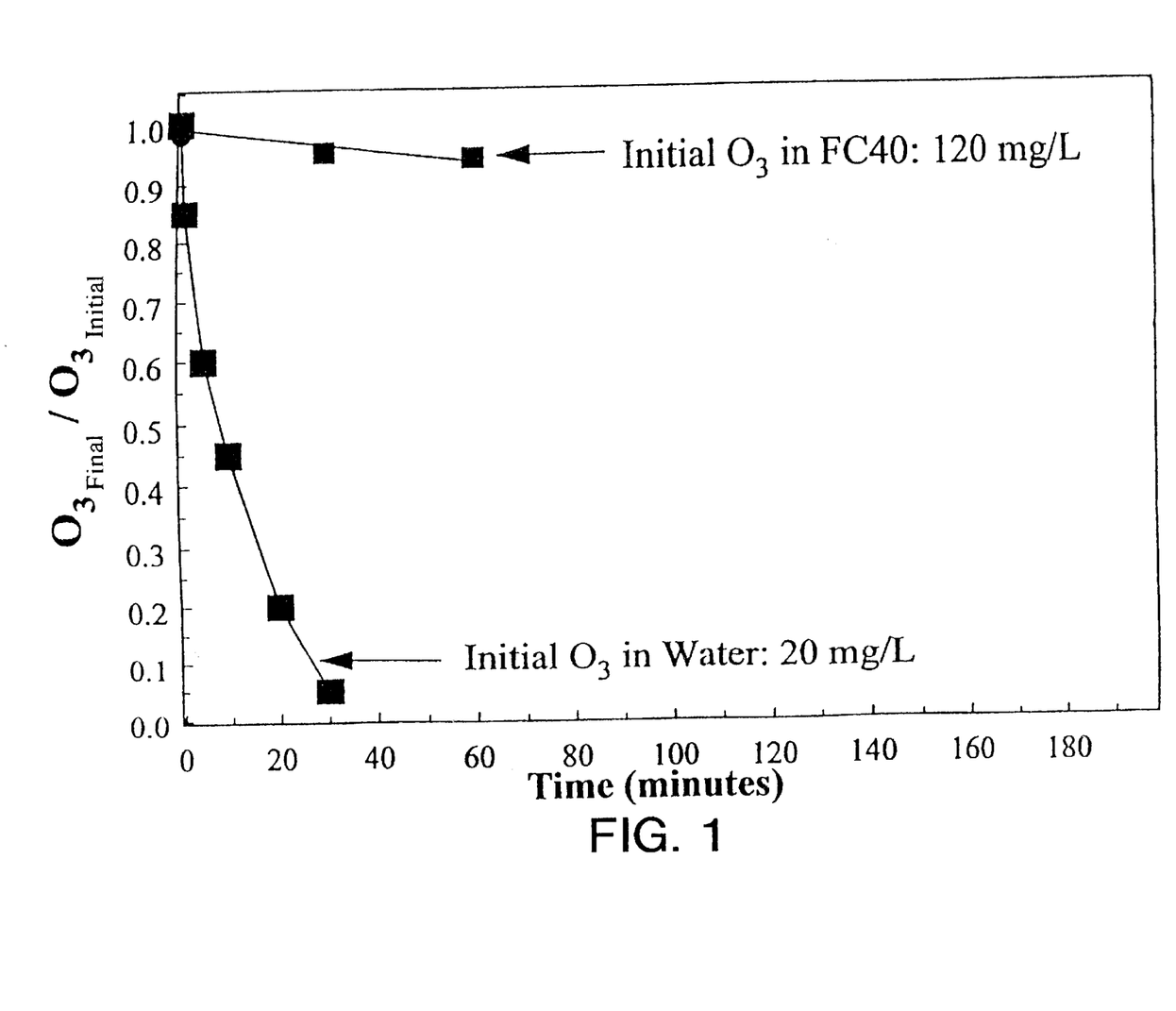
FIG. 1 is a graph setting forth physical properties of the ozone solvent/carrier found useful in the present invention.

As seen in FIG. 1, $H_2O$ has a relatively low solubility for ozone. While ozone treatments of waste water are well known and documented in the relevant art, using $H_2O$ as the ozone solvent is not suitable for treatment of crumb rubber on a commercial scale. Crumb rubber is a highly hydrophobic material which render water and similar polar solvents ineffective at coating the rubber surfaces. Without good surface coverage, the ozonation of surface molecules would be greatly limited. Even if surfactants are employed to better coat the rubber, the low solubility of ozone in $H_2O$ would greatly increase the reaction time needed for effective treatment. This is all the more true for crumb rubber, the surface of which has been found to have a large number of non-targeted molecules which consume ozone.

In the case of FC40 as solvent, the FC40 is saturated with ozone for an initial ozone concentration of about 120 mg/L. As seen in FIG. 1, the FC40 solvent maintains a relatively high ozone level over time, particularly when compared to $H_2O$ as the solvent, and at a value close to the initial concentration levels. Other solvents, or mixtures thereof, would have different saturation levels and retention rates.

The FC40 solvent is saturated with ozone from a Welsbach T-816 ozonator which produces a 2–4% ozone from highly purified oxygen. The solvent is saturated with ozone using a glass fritted glass diffusor in which the ozone/oxygen mixture has a flow rate of 0.2 liters/minute. While a Wesback T-816 ozone generator is used in the work reported here, other ozone generators can be used of different types and of other manufacturers. The diffusor which is used to inject, dissolve or disperse the ozone into the solvent can be of any inert material or material relative resistant to the oxidation environment. Glass frits and those of stainless steel are suitable and usually preferred. The frit must provide a sufficient ozone flow or capacity and diffusion capability to quickly saturate the solvent. Generally speaking, the finer the pore size the better the diffusion, distribution and the quicker the dissolution and saturation of ozone in the solvent. A plurality of ozone generators and diffusers can be used and in some cases with advantage. This is especially true in larger commercial scale operations.

The ozone-rich solvent is mixed with the crumb rubber solvent in an appropriate sized reaction vessel. Specifically, the crumb rubber is placed into a reaction vessel to which the ozone-rich solvent is added. Small reaction vessels such as a hand-held flask can be manually mixed for an initial five minute interval and remixed for additional time intervals as desired. Alternatively, the reaction vessels, particularly larger size reaction vessels, may be mechanically stirred to continuously mix the ozone rich solvent with the crumb rubber sample.

It has been found that the agitation and mixing steps hasten the reaction and/or the release of ozone from the solvent. Accordingly, it has been found useful to use a gas diffusor to continuously add ozone gas to the mixture thereby maintaining an ozone concentration close to the initial saturation point of the solvent.

Preferably, the ozonation treatment is conducted at ambient pressures and temperature (i.e. @18 deg. C.) and pressure (i.e. 1 atmosphere @14.7 lbs./sq.in), the commercial attraction of which is readily appreciated. In some cases, higher or lower temperatures can be used although not always with equal results. By the same token, sub- and super-atmospheric pressures can be used. Ambient pressures usually are preferred. Higher pressures may be advantageous in some cases to maintain the ozone in higher concentration in the solvent; but, usually only and/or when the solvent has a high, or relatively high, vapor pressure to maintain it in the liquid phase to better carry the ozone. Further, as various solvents are evaluated, it is envisioned that variations of pressure or temperature may improve the efficiency for any given solvent or solvent combination. Likewise, operating parameters may make it possible to favor a preferred reaction mechanism, target certain chemical constituents, or select for desired end products.

Following treatment, the treated rubber samples are collected on a filter such as a cellulose filter and the solvent/carrier phase is recovered. The treated samples can be washed with acetone and water and dried overnight at room temperature or vacuum separated from the solvent.

EXAMPLE 1

The general protocol set forth above used standard crumb rubber sizes described herein to treat samples of crumb rubber. Representative results are set forth here. A procedural variation for some samples included the addition of trace amounts of water at both neutral and high pH values along with the rubber sample. The presence of the water allows the formation of free radicals (OH°) which shifts the reaction pathway. As set forth in FIGS. 2 and 3, various solvent FC40 and ozone combinations were made along with variations in reaction time and variations in the presence and absence of water. Standard controls were also run. The presence or absence of $H_2O$ seems to have no readily apparent effect on the final ozonation treatment product.

Analysises of the samples were performed using x-ray absorption fine structure (XAFS) and x-ray absorption near-edge structure (XANES) spectrophotometric techniques on equipment provided by the National Synchrotron Light Source at Brookhaven National Laboratory, New York. The data set forth in FIG. 2 were calculated upon XAFS spectra collected over the energy range of 2420–2800 eV using a Si(111) double crystal monochromater with a focusing mirror aligned in the beam path. Fine stepping at 0.1 eV/step is used over the edge (XANES) region between 2462 and 2492 eV. The beam line was set for a soft focus to about a 1 cm diameter spot at each sample in order to obtain a more representative analysis of solid samples.

A zero energy position at 2472.0 eV was determined from the peak maximum of XAFS spectrum of elemental sulfur diluted 5% in a pressed pellet of boric acid. Spectra were collected from crushed samples suspended in the x-ray beam path in ultra-thin polypropylene bags in fluorescent geometry using a Lyte fluorescent detector equipped with an ultra-thin aluminized mylar window. Nitrogen was used as the detector gas and the sampling chamber was continuously flushed with helium to minimize beam absorption prior to the sample and thereby maximize the signal to noise ratio. Scans were made using a 2 to 3 second interval per point for data collection.

Figure 2:
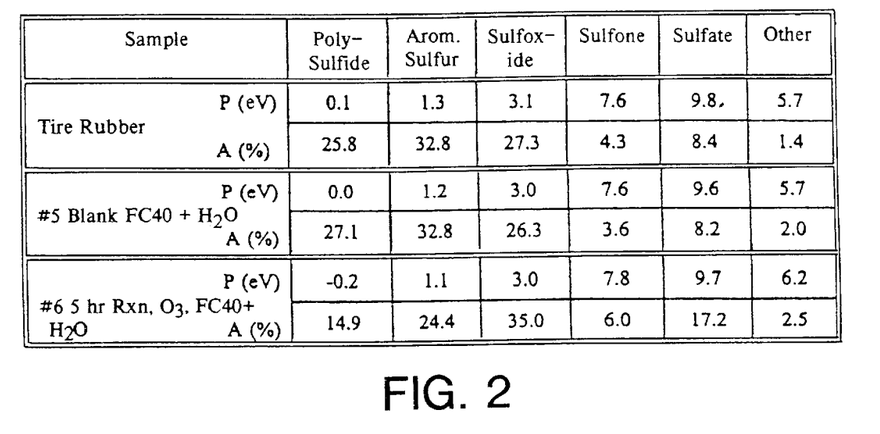
FIGS. 2 and 3 are tables of data which illustrates the changes in surface sulfur forms also known as oxidation states or surface speciation as treated within the scope of the present inventive concept.

XANES spectra were prepared from the raw XAFS spectra as reported and known in the literature. (G. P. Huffman et al., Energy and Fuels, 5,574–581, (1991) and F. E. Huggins et al., Fuel Proc. Technol., 35,233–257 (1993)). The data in FIG. 2 are least square values calculated as reported in the literature for determination of sulfur content in coal and fossil fuels (M. M. Taghiei et al., Energy and Fuel 6,293–300, (1992) and F. E. Huggins et al. Fuel Proc. and Technol. 35,233–257, (1993)). The data, as set forth in FIG. 2, provides a basis for identifying sulfur oxidation states or chemical forms on the surface of the crumb rubber as further provided in FIGS. 3–5. It should be noted that the samples and figures which refer to "tire rubber" or "initial tire" mean untreated crumb rubber.

Figure 5:
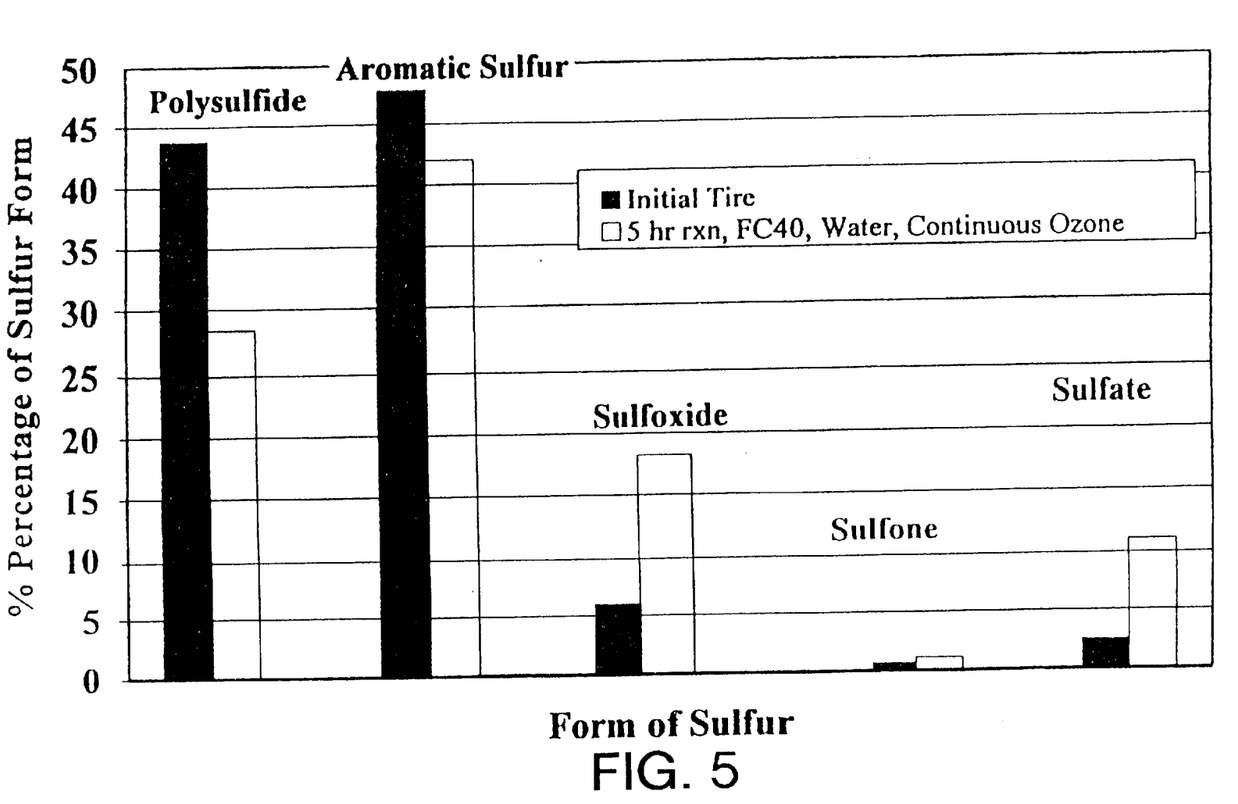

As seen in FIG. 5, initially untreated tire crumb rubber has high levels on a percent weight basis of polysulfides, aromatic sulfur and lesser amounts of sulfoxide and sulfates. While these data are from an analysis of edge and near edge samples, the nature of the starting material is such that the percent weights given for the unprocessed controls is indicative of the nonsurface/interior particle portions as well.

Control samples indicate that the presence of the solvent and solvent water combinations had no discernable effect on the sulfur content of the crumb rubber. As best seen from the data provided in FIGS. 3 and 4, continuous ozonation from 1–5 hours results in a decrease in the amount of polysulfide which is present on the crumb rubber surface. There is also a corresponding increase in the relative amount of sulfoxide and sulfates along with new reaction products of sulfones which had previously been undetected in the control samples.

While not wishing to be bound by theory, it is thought that the polysulfides are the more reactive of the sulfur constituents as it relates to using crumb rubber as a source of material for new tires. Therefore, the ability to reduce the relative concentration of polysulfides by approximately 33% using a surface ozonation process is highly beneficial even though the total amount of surface sulfur may remain relatively unchanged. The other forms of sulfur are believed to be less reactive in a rubber mixing/polymerization process and are therefore not an impediment to formulation for a commercially acceptable new tire which incorporates the surface treated crumb rubber.

Figure 3:
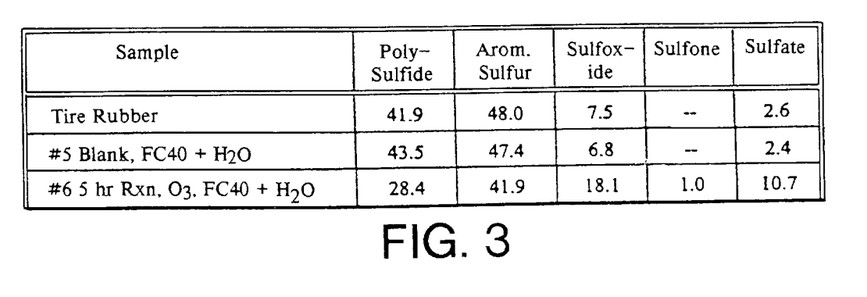
Figure 4:
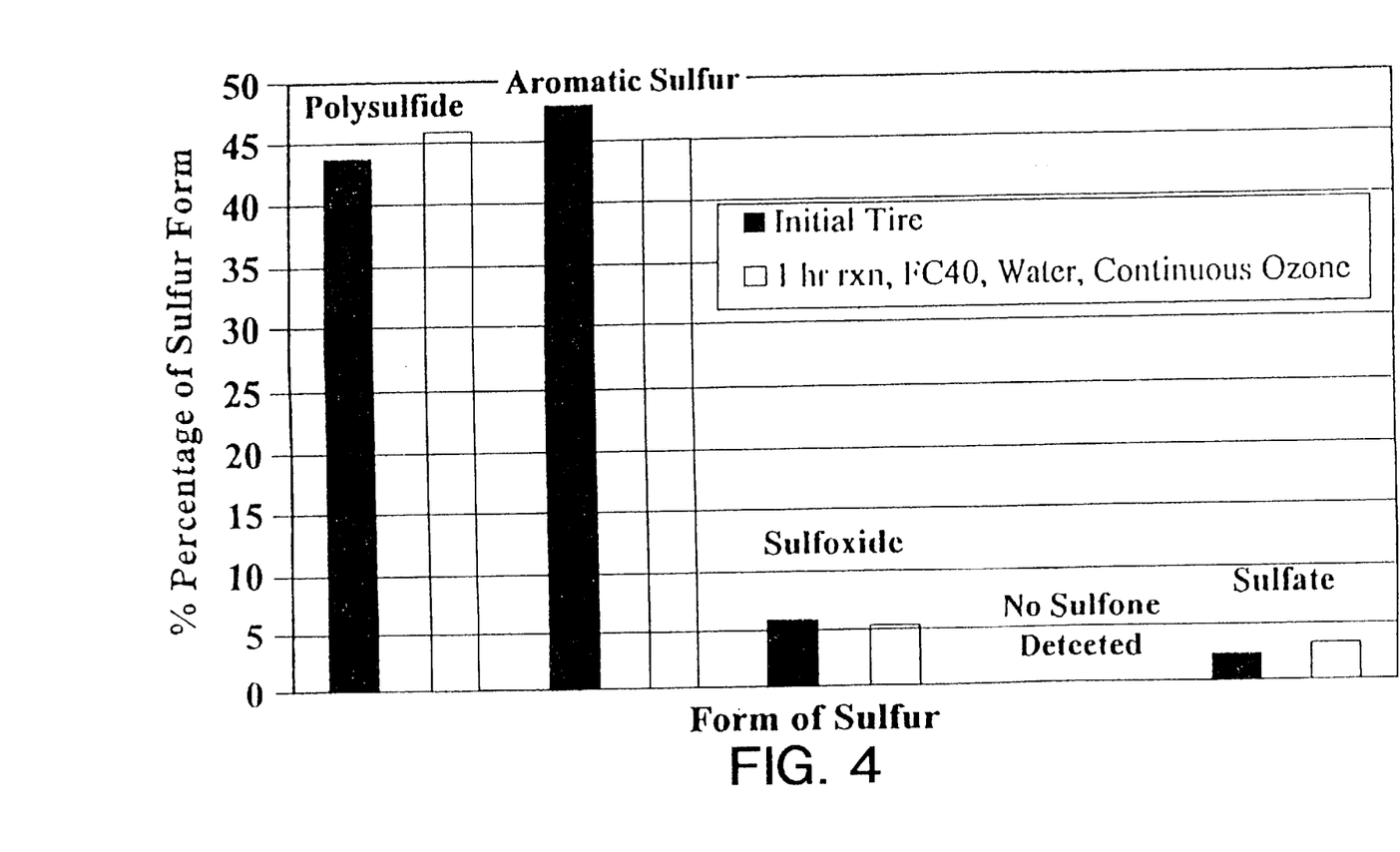
FIGS. 4 and 5 are graphs illustrating the changes to sulfur compounds on the surface of treated crumb rubber in accordance with the present invention.
Figure 6:
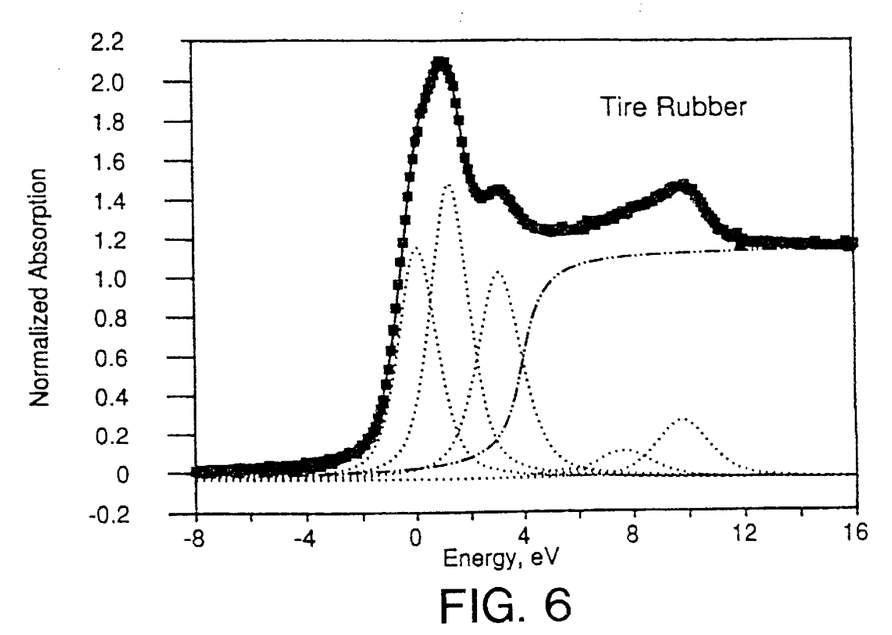
FIG. 6 shows normal absorption data versus energy (eV) for untreated crumb rubber.

FIG. 6 shows normalized absorption data versus energy (eV) for the data points represented in FIGS. 2 and 3 for untreated crumb rubber.

Figure 7:
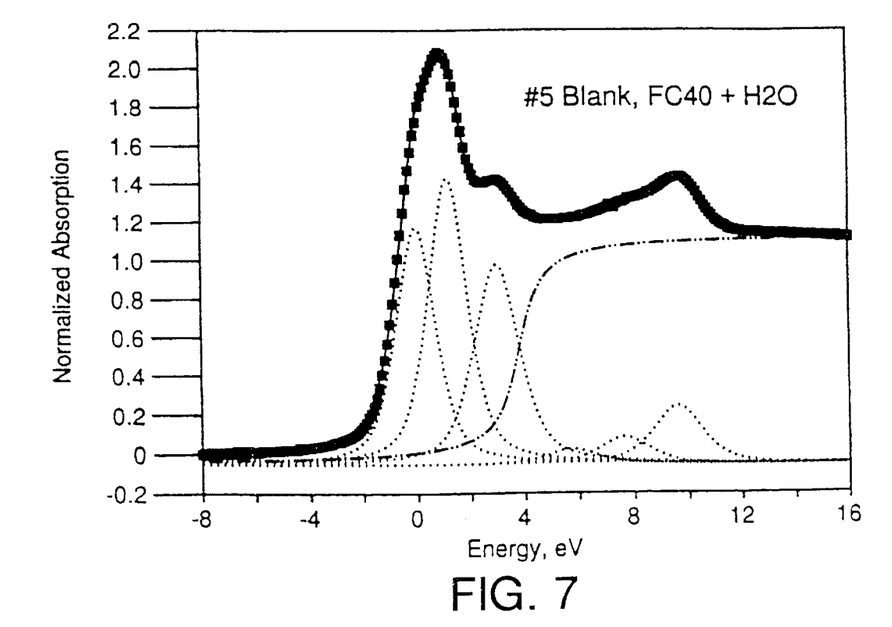
FIGS. 7 and 8 show absorption data for a solvent control and a treated crumb rubber sample.
Figure 8:
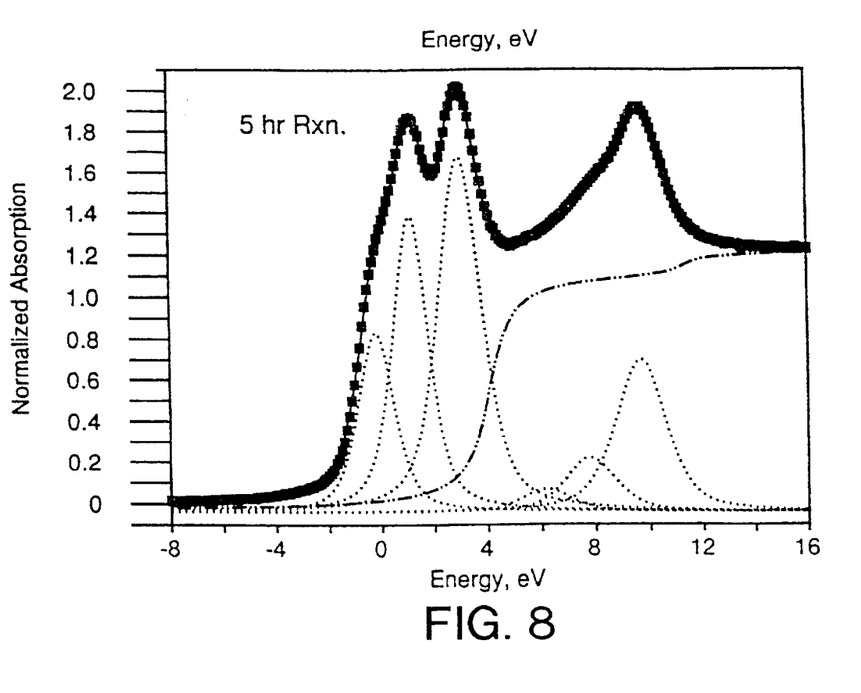
Figure 9:
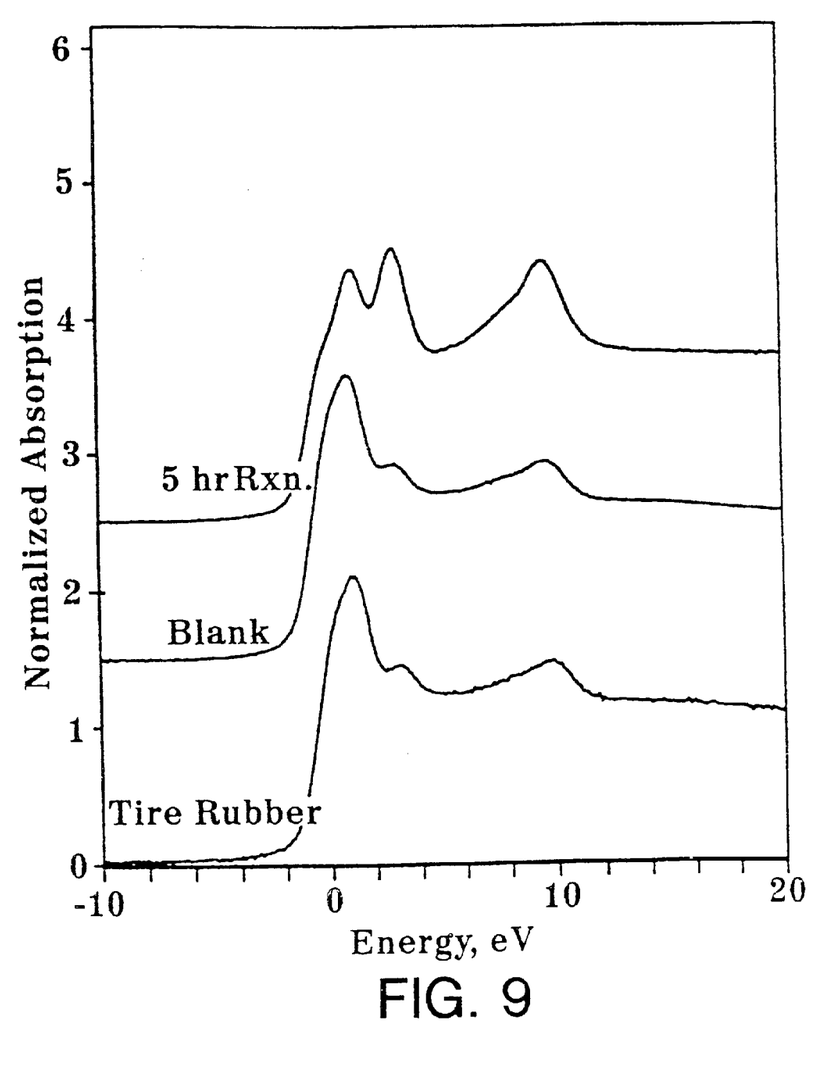
FIG. 9 is a graph setting forth normalized absorption values comparing the differences in surface sulfur composition of treated crumb rubber as compared to untreated and control samples.
Figure 10:
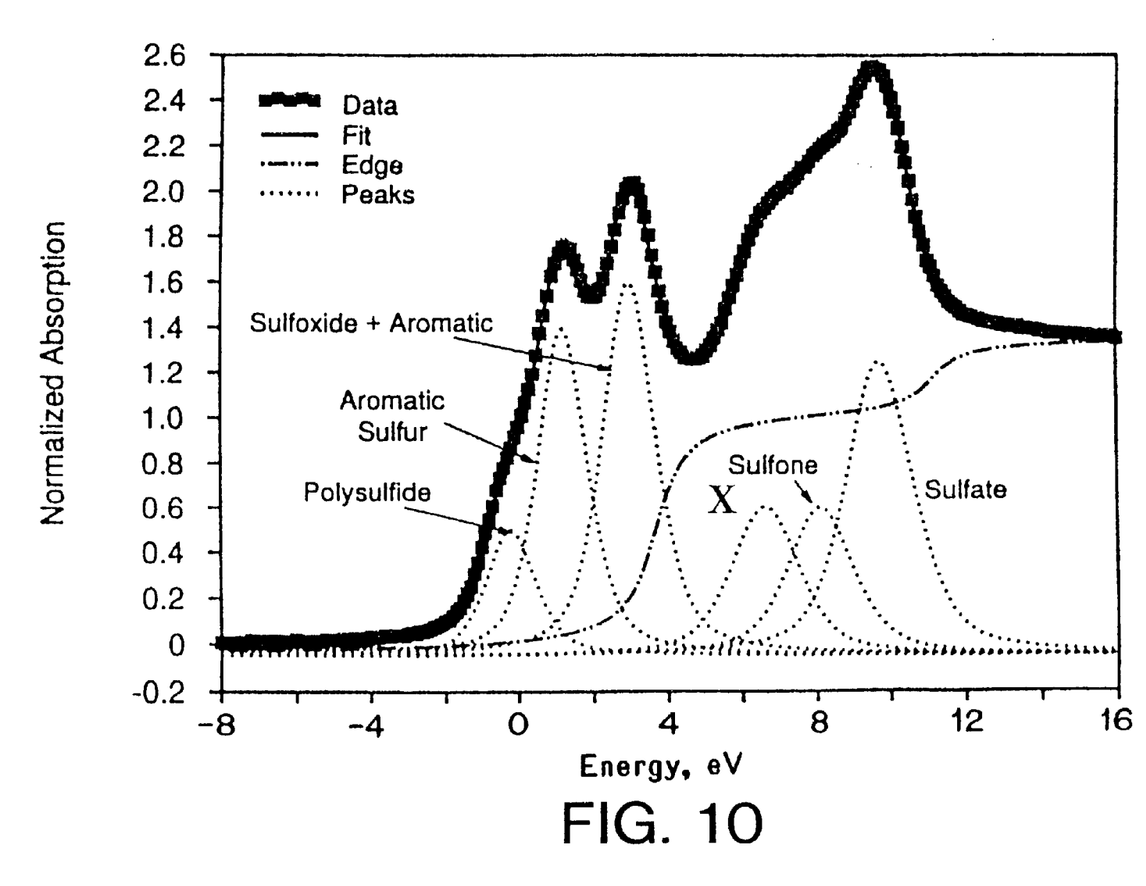
FIG. 10 is a graph showing normalized absorption of various known sulfur forms and illustrating how absorption data can be distinguished between the surface oxidation states of sulfur compounds which have been found present in untreated and treated crumb rubber.

FIGS. 7 and 8 show normalized absorption values for the solvent control ("blank") and ozone treated samples. FIG. 10 provides similar data for known sulfur forms. The peak designated "X" in FIG. 10 is an unkown form. As best seen in FIG. 9, the absorption data indicates a pronounced shifting of sulfur components to their more oxidized states with the ozone treated crumb rubber and little or no change between the solvent control and the untreated crumb rubber. Again, the more oxidized state of the treated crumb rubber is believed to correlate with a less reactive and thereby more compatible crumb rubber for use in the compounding or reformulation in a new rubber mix. It is well known in the art that conventional reclaimed crumb rubber can only be incorporated at low (approximately 5%) percentages in new formulations. Heretofore, the crumb rubber was either too reactive because of reactive sulfur groups present in the rubber, or the rubber had been reclaimed in a heat or shearing process which resulted in a crumb rubber/reclaim which imparted undesired low tensile strength, poor abrasion properties, and poor dynamic properties to the resulting product.

The present invention provides an improved crumb rubber product in which undesired chemical surface reactivity is substantially reduced. Further, the improved chemical surface reactivity is obtained without substantially diminishing or altering the desired physical properties which were pre-existing in the crumb rubber. One of ordinary skill in the art of rubber compounding and rubber compositions will readily appreciate that the treated crumb rubber can be used at greater relative quantities than the untreated crumb rubber in new rubber mixes. As a result, a rubber formulation for a new tire can make use of an increased amount of treated crumb rubber. Such a formulation enables a lower cost tire and makes use of a recycled resource which remains under utilized.

While not separately set forth in a table, experiments similar to those above indicate that short reaction times for ozonation do not result in any appreciable effect on the surface sulfur chemistry of crumb rubber. It is known that ozone has a high affinity for C=C double bonds which are also present on the surface of the crumb rubber and/or which are soluble in the solvent used. Given the greater affinity for the carbon-carbon double bonds, it is believed that the initial ozone which contacts the crumb rubber surface preferentially oxidizes the carbon to carbon double bonds. Only after this preferred chemical reaction has occurred, does significant oxidation of polysulfides and other sulfur constituents proceed.

From this discussion, combinations of particular solvent (s), reaction pressures, reaction temperatures, or a chemical catalyst or accelerator which promotes desired reaction(s) pathways will be found possible.

EXAMPLE 2

The protocols set forth in Example 1 were used to treat samples of crumb rubber. Upon separation from the carrier solvent, samples were analyzed using a scanning electron microscope to obtain a visual representation of the changes which may occur on the surface of crumb rubber.

Analyzed samples were from crumb rubber material having a cut surface particle size ranging from 25 to 75 um. While not illustrated, the surface morphology drastically changes when created with ozone. Following a 5 hour reaction of FC40 and water, the rubber surface is no longer smooth but has an uneven surface with many nodules and cavitation sites. The surface changes indicated a substantial increase in the treated crumb rubber surface area.

As a general rule, the longer ozonation reaction times result in a surface having numerous rounded nodules and cavitation features which are consistent in size. Additionally, flakes of material are present on the surface of the treated crumb rubber and increase in proportion to expose time to ozone. It is believed that this change in surface morphology directly relates to changes in the surface chemistry and similarly to the presence and form of surface sulfur. However, it is possible that the surface morphology, while indicative of ozone treatment as set forth above, is somehow related to other chemical reactions, such as C=C bond oxidation. In either event, the surface of the crumb rubber does exhibit a physical modification and has a larger surface area as a result of the cavitation and nodule formation..

The data set forth in Examples 1 and 2 above indicate that the surface treatments with ozone of crumb rubber chemically and/or physically modifies the crumb surface and changes the amount and proportion of sulfur moieties (i.e., chemical form of sulfur) which provide a more desirable crumb rubber. The use of the solvent FC40 is believed to limit the ozonation activity substantially to the surface of the crumb rubber. SEM analysis and extraction studies suggest that the FC40 solvent coats the crumb rubber but does not appreciably penetrate into the polymer matrix.

The treated crumb rubber interior thereby retains the desirable physical properties which are compatible for reformulation with a new tire polymer mix. The limiting factor which has heretofore precluded higher levels of crumb rubber involves the presence of highly reactive surface sulfur functional groups. By restricting the ozonation to the surface of the crumb rubber, one can achieve higher loading levels of treated crumb rubber in new tire mixes and without compromising the other physical properties of the crumb rubber.

The duration of ozonation of crumb rubber to achieve an effective amount of surface oxidation for commercial operation is readily determined by routine experimentation. Once the other operating parameters are selected, the extent of ozonation can be determined by performing the ozonation for different durations until a satisfactory crumb rubber is obtained as determined by use in compounding a new rubber formulation and/or by other tests described herein.

In summary, the present invention provides an improved and economical process for surface treating crumb rubber to provide a treated crumb rubber having improved chemical surface properties. These improved properties permit the crumb rubber to be incorporated at higher loading levels than untreated crumb rubber when used in new tire polymer formulations. The ability to oxidize sulfur forms (i.e., polysulfides) on the tire rubber surface is thought to slow down the surface reaction rates of the treated crumb rubber in new tire mixes, thereby allowing the treated crumb rubber to be used in new rubber mixes. By confining the treatment process to the surface of the crumb rubber, the useful mechanical and physical properties already inherent in the crumb rubber are maintained.

While the forgoing description is given in reference to a process for treating crumb rubber, the ability to surface treat solid or particulate materials with effective amounts of ozone so as to oxidize abd/or render a more desirable surface chemistry, is not limited in usefulness to crumb rubber. Accordingly, in view of the foregoing disclosure and examples, it is well within the ability of one skilled in the relevant art to make modifications and variations to the disclosed embodiments and examples, including the use of equivalent and even dissimilar materials and process steps without departing from the spirit of the invention.

What is claimed is:

1. A process for devulcanizing scrap rubber consisting essentially of:
   providing a supply of crumb rubber, said crumb rubber having an initial surface oxidation state;
   contacting the surface of said crumb rubber with a non-polar solvent, said solvent carrying an effective amount of ozone;
   oxidizing compounds carried on said surface of said crumb rubber to one of a plurality of oxidation products;
   thereby, providing a crumb rubber having a treated surface defining a treated oxidation state, said treated oxidation state being more oxidized than said initial oxidation state.

2. The process according to claim 1 wherein said non-polar solvent is a fluorinated hydrocarbon.

3. The process according to claim 1 wherein said second oxidation state is further characterized by a reduced number of polysulfide linkages relative to the first oxidation state.

4. The process according to claim 1 wherein said step of contacting a surface further comprises contacting a surface only of said crumb rubber with said non-polar solvent.

5. The process according to claim 1 wherein said oxidation products further comprise a mixture of sulfoxides and sulfates.

6. The product according to the process of claim 1.

7. A process for oxidizing the surface of vulcanized particulate rubber consisting essentially of:
   providing a supply of vulcanized particulate rubber, said rubber having an exterior surface defining a plurality of sulfur containing functional groups;
   contacting said exterior surface with an effective amount of ozone, said ozone carried in a non-polar solvent;
   maintaining contact between said ozone and said particulate rubber until an effective number of sulfur functional groups are oxidized; and
   thereby, providing a rubber particulate having a surface of sulfur compounds having a greater oxidation state than said plurality of sulfur surface compounds of said vulcanized rubber particulates.

8. The process of claim 7 wherein said non-polar solvent is a fluorinated hydrocarbon.

9. The process of claim 7 wherein the surface of the treated rubber is further characterized by a plurality of microscopic nodules and increased surface area.

10. The process according to claim 7 wherein said oxidized sulfur compounds further comprise a mixture of sulfoxide and sulfates.

11. The product according to the process of claim 7.

12. The process of claim 1 wherein said solvent carrying said ozone is further mixed with water.

13. The process according to claim 1 wherein said process is conducted at ambient pressure.

14. The process according to claim 1 wherein said process is carried out at ambient temperature.

15. A process for rendering used rubber suitable for use in compounding into new rubber products which consists essentially of:
   subjecting the surface of the used rubber to the action of a substantially inert solvent bearing a relatively high concentration of ozone for a sufficient period of time to reduce the reactivity of said so treated rubber to avoid undesired deleterious reaction during compounding the same into a new rubber product.

16. A process for treating used rubber to render it suitable for use at high loading levels in a new rubber composition consisting essentially of:

treating the surface of said used rubber with an inert solvent and a high concentration of ozone for a sufficient period of time to achieve predetermined reactivity properties when compounded into new rubber products.

17. The process according to claim 15 wherein said inert solvent is a fluorinated hydrocarbon.

18. The process according to claim 16 wherein said solvent is a fluorocarbon.

19. The process according to claim 7 wherein said solvent is selected from a group comprising a fluorocarbon and carbon tetrachloride.

20. A process for oxidizing a surface of a solid consisting essentially of:

providing a solid;

contacting said solid with an effective amount of ozone, said ozone carried in an inert solvent; and, treating the surface of said solid with said inert solvent and said ozone for a sufficient period of time to achieve predetermined reactivity properties of a surface of said solid.

21. The process according to claim 20 wherein said step of providing a solid further includes providing a solid in the form of a particulate.

22. The process according to claim 21 wherein said step of providing a solid further includes providing a particulate of rubber.

* * * * *

UNITED STATES PATENT AND TRADEMARK OFFICE
CERTIFICATE OF CORRECTION

PATENT NO. : 5,998,490
DATED : December 7, 1999
INVENTOR(S) : Steven M. SERKIZ

It is certified that error appears in the above-identified patent and that said Letters Patent is hereby corrected as shown below:

In Column 5, line 17, after "were otherwise preferred."
please change the word "suitability" to --Suitability--.

In Column 8, line 61 after the words "changes when", please change "created" to --treated--.

Signed and Sealed this

Eighteenth Day of July, 2000

Attest:

Q. TODD DICKINSON

*Attesting Officer*     *Director of Patents and Trademarks*